United States Patent [19]

Wyatt et al.

[11] 4,190,512
[45] Feb. 26, 1980

[54] SACRIFICIAL ANODES

[75] Inventors: Brian S. Wyatt, Acton Trussell; Ronald H. Wassell, Telford, both of England

[73] Assignee: I.S.C. Alloys Limited, Bristol, England

[21] Appl. No.: 902,299

[22] Filed: May 3, 1978

[51] Int. Cl.² .............................................. C23F 13/00
[52] U.S. Cl. ..................................... 204/196; 204/147
[58] Field of Search ................ 204/196, 197, 147, 148

[56] References Cited

U.S. PATENT DOCUMENTS

Re. 27,529  12/1972  Doremus et al. .................... 204/197
820,105  5/1906  Frazier .................................. 204/197

*Primary Examiner*—Arthur C. Prescott
*Attorney, Agent, or Firm*—Cesari and McKenna

[57] ABSTRACT

Sacrificial anodes are disclosed, which are basically in the form of bracelets and which have a part which is electro-chemically active and a supporting core structure in the form of a mesh or grid of a less chemically active material. Support members are embodied in the electro-chemically active part and during use these support members are disclosed, thereby enabling replacement anodes to be attached to the support core structure.

9 Claims, 6 Drawing Figures

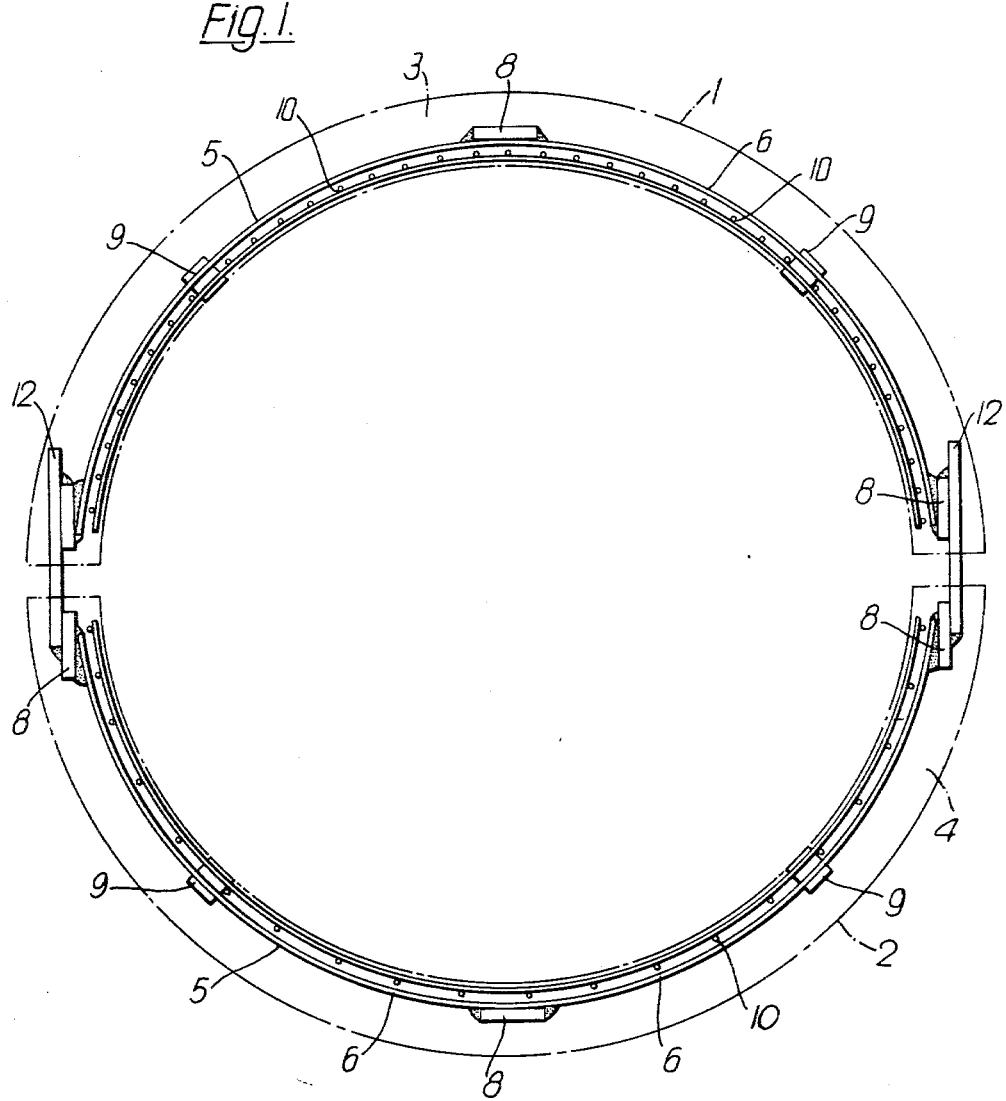

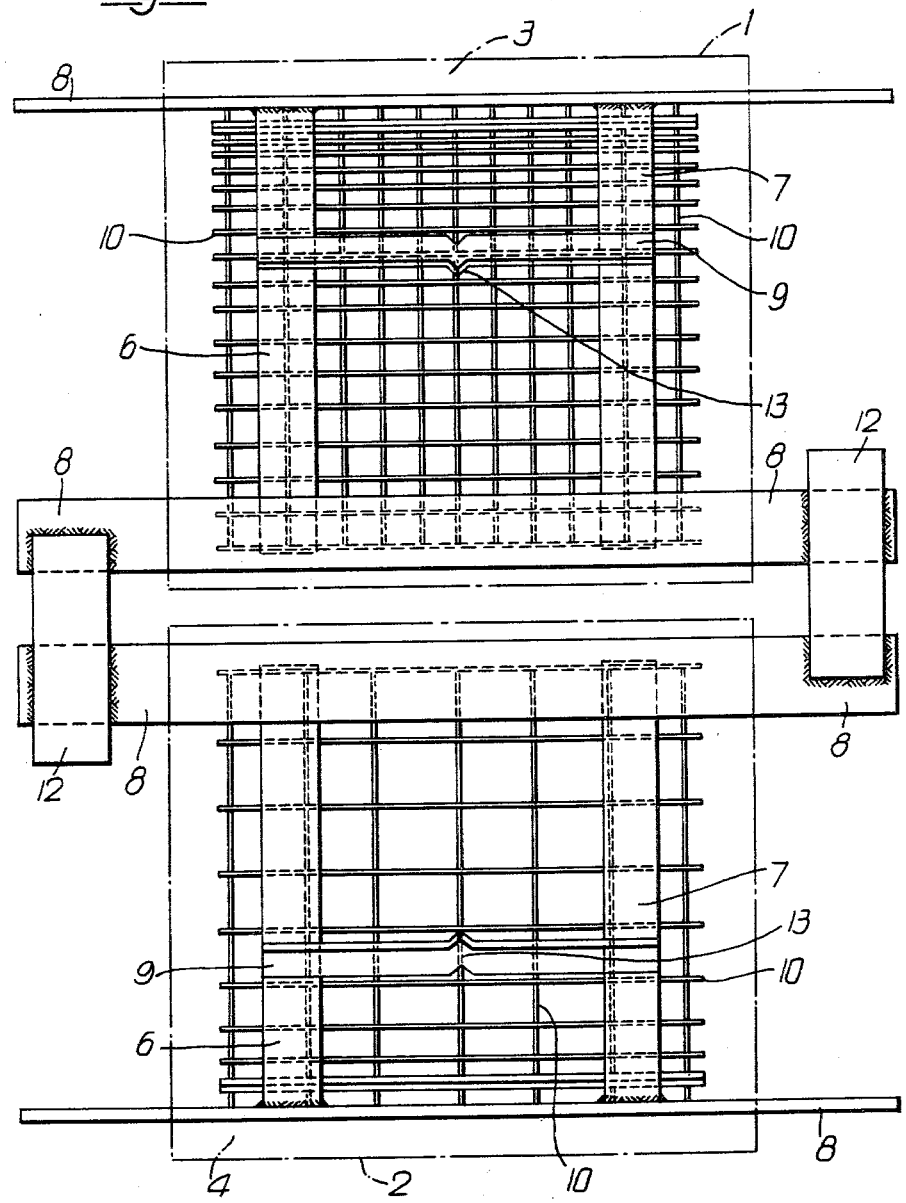

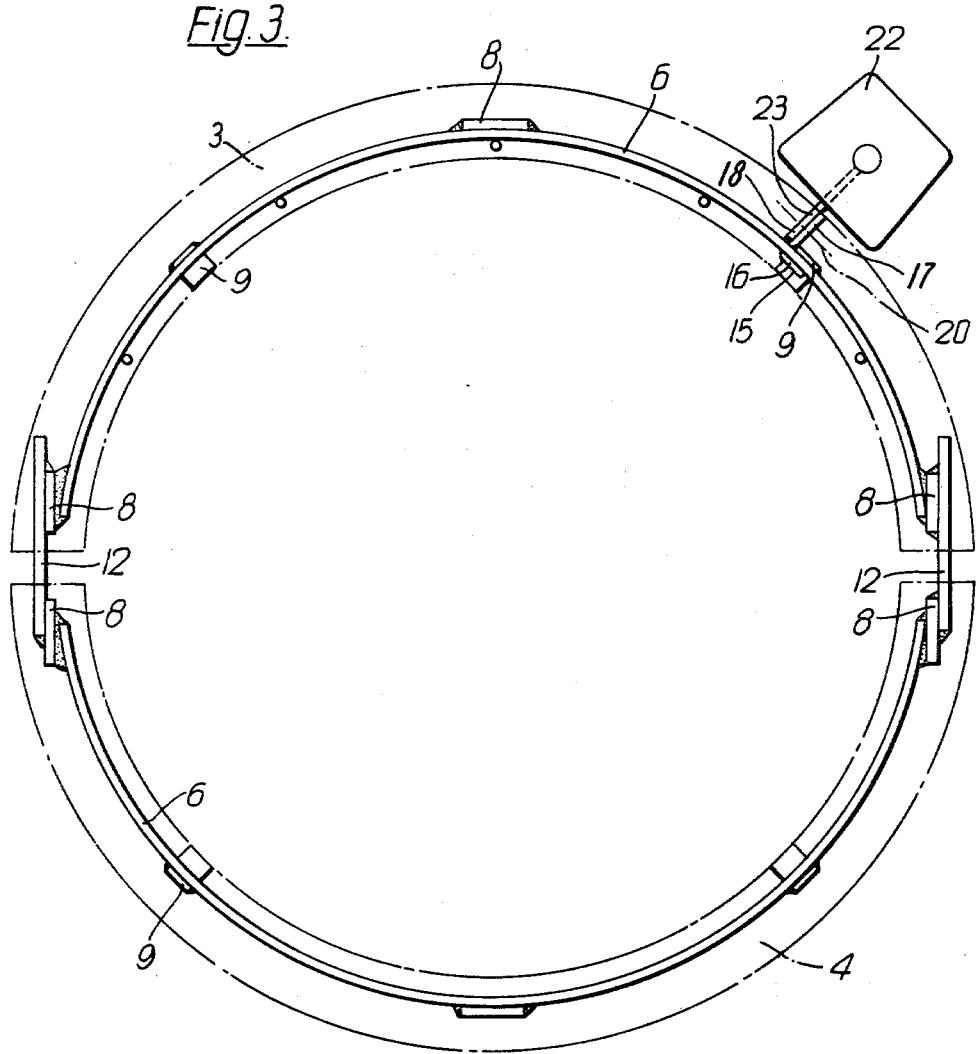

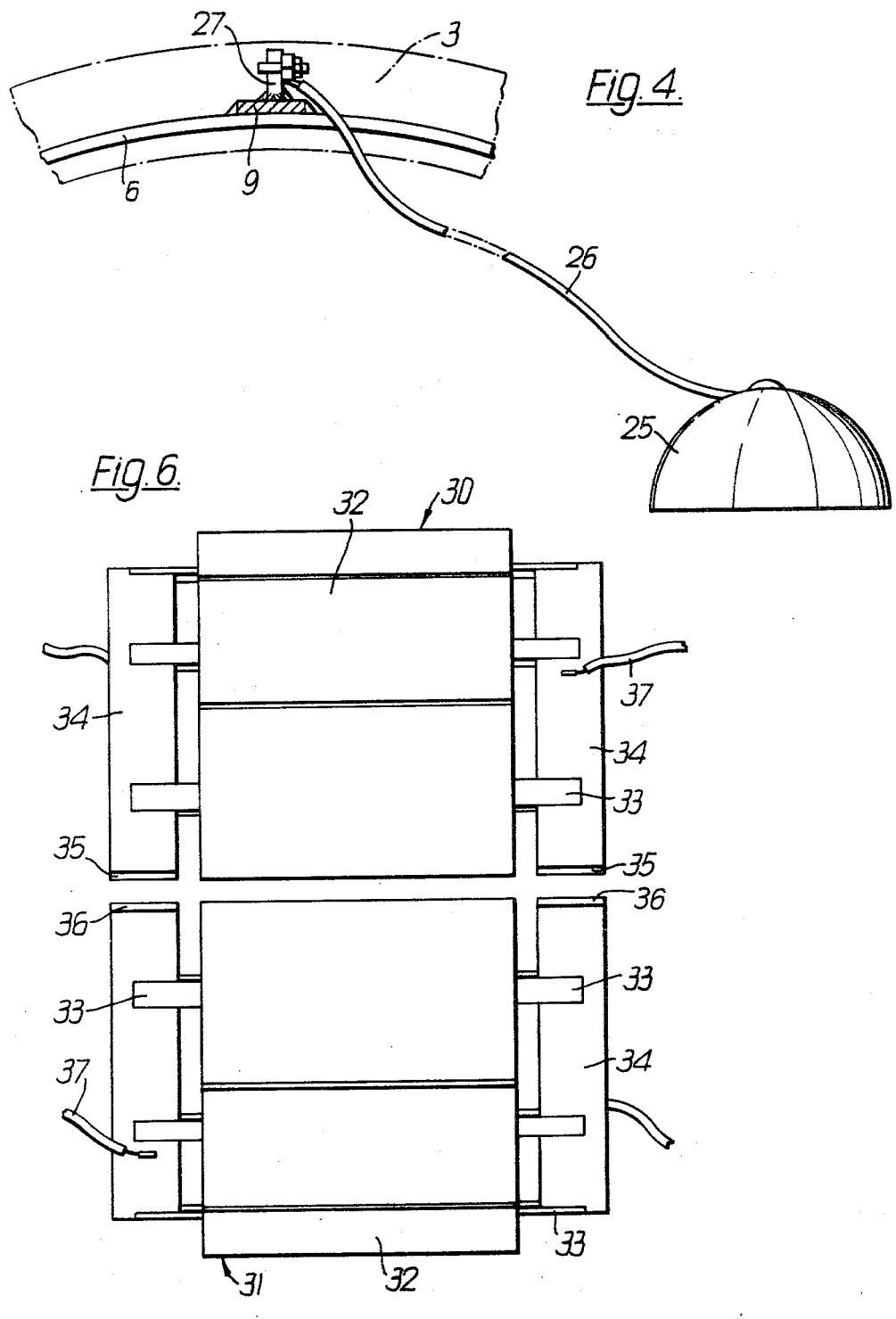

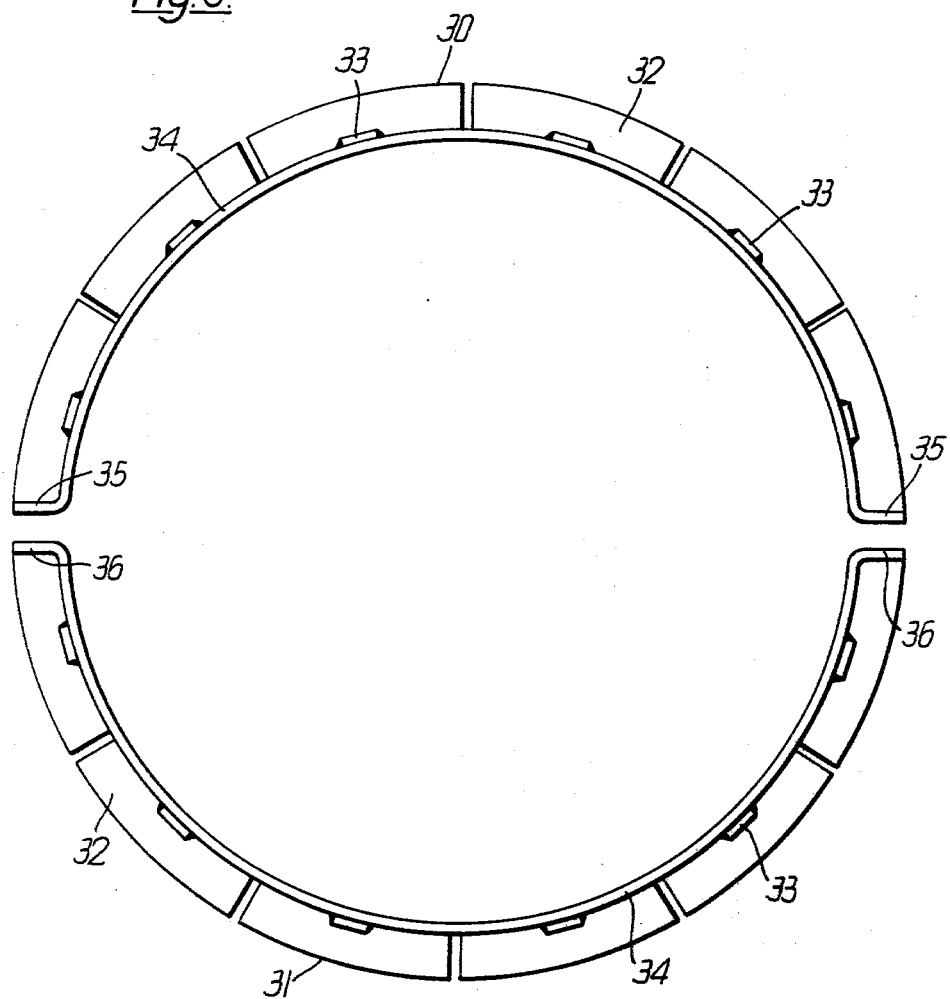

SACRIFICIAL ANODES

This invention relates to arrangements for use in the cathodic protection of submarine bodies and structures, for example pipelines. Submarine pipelines are subject to corrosion as a result of electrochemical action during their immersion in water and it is known to minimise the effect of this corrosion by providing on the pipeline, which is for example made of steel, a body of a more electrochemically active metal, for example, zinc, aluminium or magnesium alloy, than the metal of the pipeline and connecting the body electrically to the pipeline. The body of material forms an anode and the more active material of the anode corrodes in preference to that of the pipeline, the electrical current associated with the corrosion process flowing from the anode via the electrolyte and back to the pipeline.

A form of anode which is suitable for this purpose is described in U.S. Pat. No. Re. 27, 529, re-issued on Dec. 12, 1972 in the name of Gordon L. Doremus. The galvanic anode described in this U.S. patent consists of at least a pair of arcuate segments constructed of a suitable galvanic metal and having completely embedded within the galvanic metal a steel core or armature adapted to be connected together to join the anode sections into a bracelet about the pipe. The steel core or armature sections have end portions which project from opposite, longitudinal edges of the anode body to form joint elements for connecting one of the segments to the other in a pipe-embracing relation.

Anode bodies employed in this manner for the cathodic protection of submarine pipelines are commonly known as sacrificial anodes, since the active metal is sacrificed instead of the steel of the pipeline being eaten away. Unfortunately, the sacrificial anode is not eaten away evenly and parts of the material of the anode can become dislodged or in some other way disconnected from the main body of the anode so that they are wasted.

Features of anodes to be described in the present specification make less likely such wastage of the material.

According to one aspect of the present invention there is provided an arrangement for use in the cathodic protection of submarine bodies and structures, for example pipelines, including a plurality of anode bodies, each body including a first part which is constituted by a material which is electrochemically active and a supporting core structure for the first part, the supporting structure being less electro-chemically active than the first part and defining a plurality of apertured regions, there being a plurality of the said apertured regions in a direction extending transversely of the of the body and a plurality of the said apertured regions in a direction extending longitudinally of the body.

According to another aspect of the invention there is provided an arrangement for use in the cathodic protection of submarine bodies and structures, for example pipelines, including an anode body having a first part which is electrochemically active, a core which is constituted by a material which is less chemically active than the first part and a member which is of less chemically active material than the first part and is electrically connected to the core, the member being concealed within the first part, whereby, when the member is disclosed during the use of the body, a replacement anode body can be attached to the member.

The use of a bracket in the anode which becomes disclosed as the anode is eaten away and enables a replacement anode to be attached comparatively easily to an existing bracelet surrounding a pipeline is a useful feature.

It will be appreciated that features of the arrangements to be described can be applied in varying combinations to galvanic anodes of the type described in the above mentioned re-issued U.S. patent and to other types of sacrificial anode.

Embodiments of the invention will now be described, by way of example, with reference to the accompanying drawings in which:

FIGS. 1 and 2 are end and plan views respectively of a sacrificial anode.

FIG. 3 is an end view of a further anode arrangement,

FIG. 4 is a diagrammatic sketch of a detail of a further arrangement and

FIGS. 5 and 6 are end and plan views respectively of another embodiment of sacrificial anode.

Referring to FIGS. 1 and 2, there are indicated by broken lines 1 and 2 the outlines of two anode bodies 3 and 4 which include a first part made of metal which is electro-chemically more active than a pipeline with which they are to be used. Suitable metals are aluminium, zinc, magnesium and alloys thereof. Cast into each of the bodies 3 and 4 is a steel supporting core structure 5 which is less chemically active and is cathodic to the first part and is constituted by a pair of straps 6 and 7 extending longitudinally of the bodies, three bars 8 extending both transversely and beyond the edges of the bodies 3 and 4, two straps 9 which extend transversely of and within the bodies 3 and 4 and a plurality of rods 10 extending both transversely and longitudinally of the structure. The bars 8, straps 9 and rods 10 are welded to the straps 6 and 7 and it will be noted that, by way of example, the angular spacing between the transversely extending rods 10 in the body 3 is different from that in the body 4. The angular spacing of the transversely extending rods 10 in the body 3 is between 4° and 5° and that of the rods in the body 4 is between 8° and 10°. The larger the number of rods 10 in the structure, the less likely is it that large portions of the bodies 3 and 4 will fall away as the bodies are consumed during use. It will be noted that the longitudinally extending rods of body 3 are closer together than are those of body 4. In fact an improvement in utilisation factor by up to 10% has been obtained with the two arrangements described. It will be appreciated that the rods 10 of the supporting structures 5 form mesh or grid structures defining rectangular apertured regions; a plurality of the rectangular regions extending both across the width of the bodies 3 and 4 and along the length of each body.

The bars 8 near to the ends of the body 3 are joined, at their respective ends, by straps 12 to the corresponding bars 8 near to the ends of the body 4, in assembling the bodies and structures about a pipeline (not shown). It will be seen that the straps 9 are ribbed at 13 in order to key them better into the bodies 3 and 4. It would, of course, be possible to include more straps than the two 6 and 7 shown in the structure 5.

Referring to FIG. 3 there is shown an embodiment in which a right angled bracket 15 has its foot 16 welded to the underside of one of the straps 9. On the leg 17 of the bracket 15 there is a hole 18 about a centre line 20. More than one such bracket 15 can be attached to each strap 9 and, as the anode bodies 3 and 4 are eaten away during use, the legs 17 and the holes 8 are disclosed, thereby enabling a replacement anode body 22 to be attached to each strap 9 by bolting to the leg 17 by means of the hole 18 a member 23 extending from the body 22. The body 22 is considerably longer than the width of the structure 5 upon which it is mounted and it will be understood that a replacement anode or anodes of equivalent capacity to the original bodies 3 and 4 can easily be fitted when the original bodies have been consumed without removing the structure from the pipe which it surrounds or employing any welding operation. The bracket 15 could be attached to the strap 9 in some other way, for example by being bolted to the strap. It will also be understood that the structure 5 could be different from that shown, for example the rods 10 could be omitted. By providing brackets 15 around the structure at angular intervals of up to 60 degrees it is possible to ensure that one will always appear in the upper segment of the pipeline.

In a further embodiment shown in FIG. 4, a replacement anode 25 is connected, by means of a flexible lead 26 bolted to a member 27, to a strap 9 to which the member 27 is welded. The strap 9 and the member 27 may initially be concealed within the anode body 3. Alternatively, the strap 9 and the member 27 may extend transversely beyond the edges of the body 3 and the lead 26 may be bolted either directly to the strap 9 or to the meber 27 at any time.

FIGS. 5 and 6 illustrate diagrammatically structures 30 and 31 constituted by a plurality of anode segments 32 into each of which there is cast a supporting bar 33 which extends transversely of the structure well beyond the ends of the respective segment 32. Each bar 33 is welded at its ends to a strap 34 and flanges 35 on the straps 34 of the structure 30 are clamped, by means not shown, to corresponding flanges 36 on the straps 34 of the structure 31. Replacement anodes may be connected, for example, to the straps 34, as indicated by leads 37.

By arranging components of a steel supporting core structure, such as that shown at 5 in FIG. 1 and consisting of straps, 6, 7 and 9 bars 8 and rods 10, to be at or near the inner face of the anode segments 32 an improvement in the utilisation factor of the anode of some 10% is obtained.

Variations modifications and combinations of the arrangements shown may be made within the scope of the invention. For example, the segmented anodes 32 of the structures 30, 31 of FIGS. 5 and 6 could be cast on two respective mesh or grid structures 5, in a similar way to that in which the anode bodies 3 and 4 in FIGS. 1 and 2 are cast. It would also be possible to incorporate brackets, similar to the brackets 15 previously described, within the segments 32 attached to the bars 33 for mounting replacement anodes on. The shape and configuration of the various parts can also be varied within the scope of the invention. For example, the grid regions defined by the rods 10 could be other than rectangular; they could be diamond shaped. It would, alternatively, be possible for the supporting core structure to define circular grid regions, for example, and be made of perforated steel sheet.

It will also be appreciated that, although the description has been made particularly with reference to the application of the arrangement described to submarine pipelines, it can be applied to other submarine bodies and structures, for example oil rigs.

We claim:

1. An arrangement for use in the cathodic protection of submarine bodies and structures, for example, pipelines including a plurality of anode bodies, each body including a first part which is constituted by a material which is electro-chemically active and a supporting core structure for the first part, the supporting structure being less electro-chemically active than the first part and defining a plurality of apertured regions along the body, said structure including a plurality of longitudinally extending members and a plurality of transversely extending members at least one of said transversely extending members being located near an end of said body and extending transversely beyond the edges of the body.

2. An arrangement as claimed claim 1 wherein the apertured regions are defined by a plurality of longitudinally extending rods and a plurality of transversely extending rods.

3. An arrangement as claimed in claim 1 wherein a transversely extending member extends beyond an edge of the body to provide means for coupling an auxiliary anode thereto.

4. An arrangement as defined in claim 1 wherein the body is in the form of an arcuate segment.

5. An arrangement as defined in claim 1 wherein the supporting structure is cast into the first part of the body.

6. An arrangement as claimed in claim 1 including a plurality of members extending transversely of the body, a strap welded to each end of the members and flange means at each end of the strap for connection to corresponding flange means of a strap of a further body.

7. An arrangement as claimed in any one of the preceding claims including a connection member concealed within the first part of the body and electrically connected to the core structure, and said member being made of material which is less electrochemically active than the said first part, whereby, when the first part is eroded during use, the said member is disclosed and a replacement anode can be connected thereto.

8. An arrangement for use in the cathodic protection of submarine bodies and structures, for example pipelines, including an anode body having a first part which is constituted by a material which is electro-chemically active and a core which is constituted by a material which is less electro-chemically active than the first part and an attachment member which is of less electrochemically active material than the first part and which is electrically connected to the core, the said member being concealed within the first part, whereby, only when the said member is disclosed during the use of the body, a replacement anode can be attached to the member.

9. An arrangement as claimed in claim 8 wherein the core defines a plurality of apertured regions, there being a plurality of the apertured regions in a direction extending transversely of the body and a plurality of the apertured regions in a direction extending longitudinally of the body.

* * * * *

UNITED STATES PATENT AND TRADEMARK OFFICE
CERTIFICATE OF CORRECTION

PATENT NO. : 4,190,512

DATED : February 26, 1980

INVENTOR(S) : Brian S. Wyatt, Ronald H. Wassell

It is certified that error appears in the above-identified patent and that said Letters Patent are hereby corrected as shown below:

Col. 1, line 54, after "transversely", delete "of the".

Col. 3, line 1, change "8" to --18--.

Col. 3, line 28, change "meber" to --member--.

Col. 4, line 19, after "claimed" insert --in--.

Col. 4, lines 37 and 38, change "as claimed in any one of the preceding claims" to --as defined in claim 1--.

Col. 4, line 40, change "and" to --the--.

Signed and Sealed this

Tenth Day of June 1980

[SEAL]

Attest:

SIDNEY A. DIAMOND

Attesting Officer
Commissioner of Patents and Trademarks